United States Patent
Alles et al.

(10) Patent No.: US 6,425,010 B1
(45) Date of Patent: Jul. 23, 2002

(54) STEERING OF INTERNET ACCESS TO SPONSORS

(75) Inventors: Anthony L. Alles, Sunnyvale; Arthur Lin, San Ramon, both of CA (US); Juha Ilari Heinanen, Pirkkala (FI)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/235,869

(22) Filed: Jan. 22, 1999

(30) Foreign Application Priority Data

Jan. 8, 1999 (FI) .................................................. 990027

(51) Int. Cl.[7] .......................................... G06F 15/173
(52) U.S. Cl. ...................................................... 709/225
(58) Field of Search .................................. 709/203, 219, 709/220, 225, 227

(56) References Cited

U.S. PATENT DOCUMENTS

| | | | |
|---|---|---|---|
| 5,749,075 A | * 5/1998 | Toader et al. | 705/14 |
| 5,751,956 A | 5/1998 | Kirsch | 395/200.33 |
| 5,774,869 A | 6/1998 | Toader | |
| 5,806,043 A | 9/1998 | Toader | 705/14 |
| 5,855,008 A | 12/1998 | Goldhaber et al. | 705/14 |
| 5,864,604 A | 1/1999 | Moen et al. | 379/88 |
| 6,181,690 B1 | * 1/2001 | Civanlar | 370/352 |

FOREIGN PATENT DOCUMENTS

| | | | | |
|---|---|---|---|---|
| EP | 0 848 338 | 6/1998 | | |
| WO | WO 96 39668 A | 12/1996 | | |
| WO | WO 98 20646 A | 5/1998 | | |
| WO | WO 98 4193 A | 9/1998 | | |
| WO | WO 98 40826 A | 9/1998 | | |
| WO | WO9841913 A | 9/1998 | | |
| WO | WO 99/07144 | 2/1999 | ............ | H04N/7/16 |

OTHER PUBLICATIONS

Khakzar K: "The VB5 Interface—A Standard Interface for the Connection of Broadband Access Networks" Frequenz, De, Schiele Und Schon GMBH. Berlin, vol. 51, No. 3/04, Mar. 1, 1997, pp. 95–100, XP000698201; ISSN: 0016–1136; whole document.

* cited by examiner

*Primary Examiner*—John A. Follansbee
(74) *Attorney, Agent, or Firm*—Blakely Sokoloff Taylor & Zafman LLP

(57) ABSTRACT

This invention provides an Internet Access Provider (IAP) a simple mechanism to steer users to given Internet services, such as the Web pages, of sponsors. The mechanism allows a sponsor to grant a dial-in user unlimited access to the Internet after the user has first accessed its Internet services. The invention is thus important for any IAP that wants to receive income from sponsors by steering Internet users to their services. In the ultimate case, an IAP could receive all its income from sponsors and thus be able to offer the Internet access for free. The key characteristics of the present invention is that a user is steered to the Internet services of a sponsor based on a sponsor specific called telephone number or a sponsor specific login name.

20 Claims, 1 Drawing Sheet

STEERING OF INTERNET ACCESS TO SPONSORS

FIELD OF THE INVENTION

The present invention relates to steering an Internet user to given services of a sponsor.

DESCRIPTION OF THE RELATED ART

U.S. Pat. No. 5,774,869 (Toader) discloses a method for providing sponsor paid Internet access and simultaneous sponsor promotion. It is based on distribution of floppy disks that contain unique PINs for each user and an Internet access software. The software accesses and handshakes with an Internet Entry Server, which verifies the PIN number and sponsor paid Internet access time. The Internet Entry Server also performs a registration process which includes a number of personal questions and custom data gathering queries tailored by the sponsor and may give the user a mandatory "guided tour" of the sponsor's Internet Home Page where the user is exposed to current products and/or services of the sponsor and can download promotional coupons, product information, etc. The user is then released to browse the Internet and, after the free time is over, user paid refresh options are provided.

SUMMARY OF THE INVENTION

The present invention provides an Internet Access Provider (IAP) a simple mechanism to steer users to given Internet services, such as the Web pages, of a sponsor. The mechanism allows the sponsor to grant a dial-in user unlimited access to the Internet after the user has first accessed given Internet services. The invention is thus important for any IAP that wants to receive income from sponsors by steering Internet users to their services. In the ultimate case, the IAP could receive all of its income from sponsors and thus be able to offer the Internet access for free.

The key characteristics of the present invention is that a user is steered to the Internet services of a sponsor based on a sponsor specific called telephone number or a sponsor specific login name.

Unlike in U.S. Pat. No. 5,774,869, an IAP does not need to uniquely identify the users and therefore no user specific PIN numbers nor software are needed. Instead, sponsors can promote their offers by publicly advertising their sponsor specific Internet access telephone numbers or login names.

Also, the user registration process is in the present invention handled by the sponsor's own computer (usually a Web server) not by the IAP like in U.S. Pat. No. 5,774,869. The present invention thus greatly simplifies the functions of the IAP by making them sponsor independent and minimizes the amount of information that needs to be transfered between the sponsor and the IAP.

BRIEF DESCRIPTION OF THE DRAWING

The FIGURE in the drawing is a schematic diagram of steering Internet users to given sponsor services according to the present invention. In the FIGURE four users access the Internet by exploiting the offers of two sponsors.

DETAILED DESCRIPTION OF THE INVENTION

Figure 1:
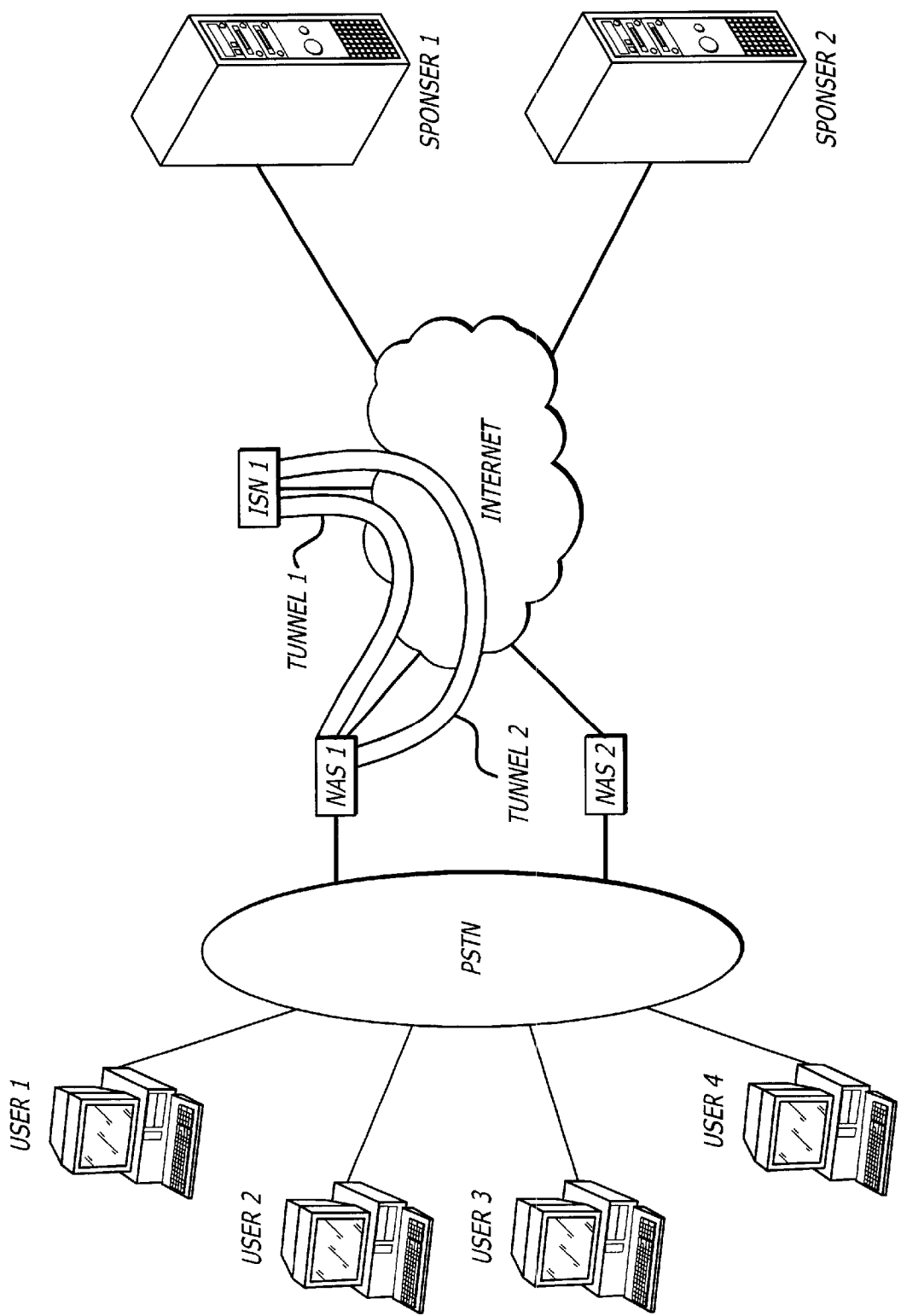

The steering process works as follows.

1. A party that provides services on the Internet makes a sponsoring agreement with an IAP. The sponsor and the IAP agree on how users identify themselves as customers of the sponsor when accessing the Internet and which services the users are allowed to access before they are granted unlimited Internet access.

There are at least two ways how the users can identify themselves as customers of a sponsor. One possibility is that the IAP allocates to the customers of the sponsor a set of sponsor specific Internet access telephone numbers. Another possibility is that the IAP and the sponsor agree on a sponsor specific Internet login name, such as guest@sponsor.com, to be used by the customers of the sponsor during the standard PPP (Point to Point Protocol) login process.

The services that the customers of the sponsor are allowed to access before they are granted unlimited Internet access can be identified by IP addresses of the servers where the services reside. If needed, the IP addresses can be further augmented by TCP or UDP port numbers that identify individual applications within the servers.

Once the method of sponsor identification and the list of services has been agreed, the information is stored in a central database that can be queried by the network devices of the IAP. Alternatively, the information is distributed to all relevant network devices of the IAP.

2. The sponsor advertises to the public its willingness to sponsor Internet access. The advertisements include the Internet access telephone number(s) and, if needed, a login name that the users need to use in order to exploit the sponsor's offer.

3. When a user accesses the Internet using the information advertised by the sponsor, the telephone call from the user's terminal device (usually a PC) is terminated in a Network Access Server (NAS) of the IAP. The NAS then either terminates the PPP login process or creates (if one doesn't already exist) a sponsor specific tunnel to an Internet router, called in the following Internet Service Node (ISN), that takes care of the termination of the PPP login process. The tunneling protocol can be any protocol that can carry PPP packets, such as L2TP, PPTP, ATM or FR. If needed, the Quality of Service (QoS) characteristics (bandwidth and delay) of the tunnel can vary depending on which sponsor the tunnel belongs to.

The choice between terminating the PPP login process in the NAS or tunneling the PPP protocol to an ISN depends on the capabilities of the NAS. If the NAS supports steering of Internet access as described below, then tunneling of the PPP protocol from the NAS to an ISN is not needed (NAS 2 in the FIGURE). If this is not the case, then steering of Internet access is still possible without any modifications to the existing NAS by tunneling the PPP protocol to an ISN (NAS 1 in the FIGURE).

As the result of the PPP login process, the user's terminal device has been allocated a unique IP address for the duration of the current Internet session.

5. Upon completion of the PPP login process, the NAS or the ISN (whichever terminated the PPP login process) installs for the user a sponsor specific access list that allows the user to communicate only with a (possibly restricted) set of applications on the servers of the sponsor. The NAS chooses the correct access list by identifying the sponsor either by the called telephone number or by the login name, whereas the ISN chooses the correct access list by identifying the sponsor by the sponsor specific tunnel that contains the user's PPP session.

The access list contains the IP address of the user's terminal device and the IP address(es) of the server(s) that the user is allowed to access. If the set of applications is restricted, the allowed or denied services can be identified by their TCP or UDP port numbers.

The access list forces the user to first access only the services of the sponsor before the user can access anything else on the Internet. If the sponsor's services are Web based, this gives the user an incentive to configure a home page of the sponsor as the user's starting Web page. Alternatively, the NAS or the ISN (whichever takes care of the steering) can convert the user's first Web request to a request for the sponsor's home page.

At this point the user is thus able to only access the Internet services of the sponsor. The sponsor can exploit the situation by various ways. For example, the sponsor can make the user register and/or login on the sponsor's home page before granting the user unlimited access to the Internet. In another example, the sponsor may simply ask the user to visit some of the sponsor's Web pages as the precondition of unlimited access to the Internet.

6. After the user has completed the actions required by the sponsor, the sponsor informs the NAS or the ISN (whichever takes care of the steering) that the user (as identified by the IP address of the user's terminal device) should be granted unlimited access to the Internet. The NAS or the ISN accomplishes this by removing the access list that it installed upon completion of the PPP login process.

There exists many different ways how the sponsor's Internet server can inform the NAS or the ISN that the access list associated with the IP address of the user's terminal device should be removed. For example, a special protocol could be designed that the sponsor's server uses to convey the user's IP address to the NAS or ISN. In another example, the NAS or the ISN implements a Web server and the sponsor's Internet server executes a CGI (Common Gateway Interface) program on the Web server and passes to it the user's IP address as an argument.

In order to inform the NAS or the ISN that an access list should be removed, the sponsor's Internet server needs to know the IP address of the NAS or the ISN that has allocated the IP address for the user's terminal device and thus is responsible of the steering. Again there exists many different ways, how the Internet server can obtain this information.

If a single NAS or ISN is used for the steering, the sponsor's Internet server can be configured with the IP address of this NAS or ISN. If more than one ISN or NAS is used, the sponsor's Internet server could query an LAP database and ask the IP address of the NAS or ISN, which has allocated the IP address for the user's terminal device. In some cases, it may be possible to algorithmically determine the IP address of the NAS or the ISN from the IP address of the user's terminal device, for example, by replacing the last octet of the address by value 1.

7. After the access list has been removed, the sponsor's Internet server could, as the last action before fully relinquishing control of the user, redirect the user to one of its Internet services, for example, by sending a Web page to the user's Web browser.

8. No special mechanism is needed for termination of the Internet session. The user simply disconnects the PPP session, which frees the IP address assigned for the user's terminal device.

It will be obvious to the reader that various modifications are possible within the scope of the present invention, and that the above-described embodiments are examples only.

What is claimed is:

1. Steered Internet access where a dial-up user is first steered to services of a sponsor and thereafter gets unlimited access to Internet, characterized (1) in that the steering is handled by an Internet Access Provider (IAP) based on contents of a sponsor-specific access list including one or more Internet Protocol (IP) addresses of a server controlled by the sponsor, and determination when unlimited access should be granted is handled by the sponsor, (2) by sponsor specific tunneling of Point to Point Protocol (PPP) sessions between a Network Access Server (NAS) and an Internet router of the IAP in case the NAS is not capable of steering Internet access, (3) by automatic installation of the sponsor-specific access list for the user in the NAS or, in case of tunneling, in the Internet router, after termination of the PPP login sessions, and (4) by removal of the sponsor-specific access list after notification by the sponsor.

2. Steered Internet access according to claim 1, characterized in that the user identifies the sponsor to a Network Access Server (NAS) via one or more public, sponsor specific Internet access telephone numbers.

3. Steered Internet access according to claim 1, characterized in that the user identifies the sponsor to a Network Access Server (NAS) via one or more public, sponsor specific login name.

4. Steered Internet access according to claim 1, characterized by the notification method where the sponsor executes a CGI (Common Gateway Interface) program on the Web server of the NAS or the Internet router and passes an IP address of the user as an argument to the server controlled by the sponsor.

5. A method comprising:
  establishing a connection to network access server of an access provider, the access provider enabling access to a network;
  selecting a temporary sponsor specific access list at the network access server to restrict access to at least one server coupled to the network and controlled by a specific sponsor without unique identification of a user, the access list including an assigned address of a terminal device connected to the network access server and an address of the server; and
  notifying the network access server to remove the access list for enabling the terminal device to have unlimited access of the network once a user of the terminal device has completed requisite actions.

6. The method of claim 5, wherein the network is a wide area network including the Internet.

7. The method of claim 6, wherein prior to notifying the network access server, the method further comprises accessing one or more web pages of the sponsor as the requisite actions.

8. The method of claim 7, wherein prior to notifying the network access server, the method further comprises querying a database of the access provider for an Internet Protocol (IP) address of the network access server.

9. The method of claim 6, wherein prior to notifying the network access server, the method further comprises accessing a home page of the sponsor and requiring the user to register at the home page of the sponsor.

10. The method of claim 6, wherein prior to establishing the connection, the method further comprises configuring the server of the sponsor with an Internet Protocol (IP) address of the network access server.

11. The method of claim 5, wherein the providing of the connection is accomplished without software customized for each user.

12. The method of claim 5, wherein the selection of the access list is accomplished by identifying a telephone number used to connect to the network access provider.

13. The method of claim 5, wherein the selection of the access list is accomplished by identifying a login name entered by the user during establishment of the connection to the network access server.

14. A method comprising:
  initiating a of a point-to-point (PPP) login process by a user of a terminal device to network access server of a network access provider;
  undergoing a tunneling operation by the network access server to create a sponsor specific communication link with a router that controls access to a wide area network;
  selecting a temporary sponsor specific access list at the router to restrict access to at least one server coupled to the wide area network and controlled by a specific sponsor without unique identification of the user, the access list including an assigned Internet Protocol (IP) address of the terminal device and an IP address of the server;
  installing the sponsor specific access list upon completion of the PPP login process; and
  notifying the router to remove the access list for enabling the terminal device to have unlimited access of the network once the user has completed requisite actions.

15. The method of claim 14, wherein the selection of the access list is accomplished by identifying a telephone number used to connect to the network access provider.

16. The method of claim 14, wherein the selection of the access list is accomplished by identifying a login name entered by the user during the PPP login process.

17. The method of claim 14, wherein prior to notifying the router, the method further comprises accessing one or more web pages of the sponsor as the requisite actions.

18. The method of claim 14, wherein prior to notifying the router, the method further comprises accessing a home page of the sponsor and requiring the user to register at the home page of the sponsor.

19. The method of claim 14, wherein prior to notifying the router, the method further comprises querying a database of the access provider for an Internet Protocol (IP) address of the router.

20. The method of claim 14, wherein prior to establishing the connection, the method further comprises configuring the server of the sponsor with an Internet Protocol (IP) address of the router.

* * * * *